(12) United States Patent
Kim et al.

(10) Patent No.: US 12,203,844 B2
(45) Date of Patent: Jan. 21, 2025

(54) PHOTO-ACOUSTIC SENSOR DEVICE AND PHOTO-ACOUSTIC SENSING METHOD OF THE SAME

(71) Applicant: Electronics and Telecommunications Research Institute, Daejeon (KR)

(72) Inventors: Bong Kyu Kim, Daejeon (KR); Jong Deog Kim, Daejeon (KR); Jeong Won Park, Daejeon (KR); Chul Huh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 127 days.

(21) Appl. No.: 17/903,167

(22) Filed: Sep. 6, 2022

(65) Prior Publication Data

US 2023/0138688 A1     May 4, 2023

(30) Foreign Application Priority Data

Nov. 2, 2021    (KR) .................. 10-2021-0148589
Jul. 8, 2022    (KR) .................. 10-2022-0084133

(51) Int. Cl.
*G01N 21/17*     (2006.01)

(52) U.S. Cl.
CPC ... *G01N 21/1702* (2013.01); *G01N 2291/021* (2013.01)

(58) Field of Classification Search
CPC ......... G01N 21/1702; G01N 2291/021; G01N 2291/02475; G01N 29/043; G01N 29/2418; G01N 29/326; G01N 21/359; G01N 2021/1708
See application file for complete search history.

(56) References Cited

U.S. PATENT DOCUMENTS

| | | |
|---|---|---|
| 2012/0279280 A1 | 11/2012 | Rezachek et al. |
| 2012/0306790 A1 | 12/2012 | Kyung et al. |
| 2013/0121106 A1* | 5/2013 | Nishihara ............ A61B 5/0073 367/7 |
| 2018/0143690 A1 | 3/2018 | Hwang |
| 2020/0073103 A1* | 3/2020 | Wang ................. G01N 21/1702 |

FOREIGN PATENT DOCUMENTS

| | | | | |
|---|---|---|---|---|
| JP | 10248817 A | * | 9/1998 | ............ G06F 19/00 |
| KR | 10-2021-0019382 A | | 2/2021 | |

OTHER PUBLICATIONS

Baek, Jun-Hyeok, et al. "Control of laser-induced mechanical effects by using a dual-wavelength irradiation method." *Journal of the Korean Physical Society* vol. 67. Issue 12 (2015). pp 2146-2153.

(Continued)

*Primary Examiner* — Catherine T. Rastovski
*Assistant Examiner* — Drexel Alejandro Venero
(74) *Attorney, Agent, or Firm* — NSIP Law

(57) ABSTRACT

Disclosed are a photo-acoustic sensor device and a photo-acoustic sensing method of the same. The sensing method includes providing a source light in a subject and receiving an ultrasonic wave generated in the subject by the source light. The source light may have a wavelength of 1400 nm to 2500 nm in a near-infrared band.

4 Claims, 6 Drawing Sheets

(56) References Cited

OTHER PUBLICATIONS

Pleitez, Miguel A., et al. "In vivo noninvasive monitoring of glucose concentration in human epidermis by mid-infrared pulsed photoacoustic spectroscopy." *Analytical chemistry* vol. 85. Issue 2 (2013). pp 1013-1020.

Tanaka, Y., et al. "Resonant photoacoustic spectroscopy for a non-invasive blood glucose monitoring: human interface and temperature correction technology." *Photons Plus Ultrasound: Imaging and Sensing 2019*. vol. 10878. SPIE, (2019). pp. 1-7.

Deng, Ruru, et al. "Measuring pure water absorption coefficient in the near-infrared spectrum (900-2500 nm)." *Yaogan Xuebao—Journal of Remote Sensing* vol. 16. Issue 1 (2012). pp. 192-206.

\* cited by examiner

PHOTO-ACOUSTIC SENSOR DEVICE AND PHOTO-ACOUSTIC SENSING METHOD OF THE SAME

CROSS-REFERENCE TO RELATED APPLICATIONS

This U.S. non-provisional patent application claims priority under 35 U.S.C. § 119 of Korean Patent Application Nos. 10-2021-0148589, filed on Nov. 2, 2021, and 10-2022-0084133, filed on Jul. 8, 2022, the entire contents of which are hereby incorporated by reference.

BACKGROUND

The present disclosure herein relates to a sensor device and a sensing method of the same, and more particularly, to a photo-acoustic sensor device and a photo-acoustic sensing method of the same.

In general, photo-acoustic sensor devices may measure a change in a composition ratio of a material contained in a light absorber by measuring a change in an ultrasonic signal generated when light is absorbed by the light absorber. Furthermore, photo-acoustic sensor devices may perform gas concentration measurement, non-invasive living body measurement, and non-invasive blood glucose measurement. Such photo-acoustic sensor devices are widely used in high-sensitivity measurement technology. However, photo-acoustic sensor devices may have a limitation such as a requirement of precision control according to a temperature change.

SUMMARY

The present disclosure provides a photo-acoustic sensor device and a photo-acoustic sensing method of the same, which are capable of removing or minimizing photo-acoustic noise due to a temperature change.

The present disclosure provides a photo-acoustic sensing method. The sensing method includes providing a source light in a subject and receiving an ultrasonic wave generated in the subject by the source light. Here, the source light may have a wavelength of 900 nm to 3000 nm in a near-infrared band.

According to an example, the source light may include a first source light; and a second source light having a wavelength that is different from the wavelength of the second source light.

According to an example, the first source light may have a first wavelength of a range of 1400 nm to 1500 nm.

According to an example, the first wavelength of the first source light may further have a range of 1800 nm to 2500 nm.

According to an example, the second source light may have a second wavelength of a range of 1500 nm to 1800 nm.

According to an example, the second wavelength of the second source light may further have a range of 1400 nm or less.

According to an example, the ultrasonic wave may include: a first ultrasonic wave generated by the first source light; and a second ultrasonic wave generated by the second source light.

According to an example, the first ultrasonic wave may be obtained as a reference signal including a noise value, and the second ultrasonic wave may be obtained as a detection signal including a measurement value.

According to an example, the method may further include obtaining an absorption coefficient value by removing the noise value from the measurement value.

According to an example, the method may further include obtaining a blood glucose value by comparing the absorption coefficient value with a reference value.

A photo-acoustic sensor device according to an example of the inventive concept includes: a light source configured to provide a source light to a subject; a detector configured to receive an ultrasonic wave generated in the subject by the source light; and a control unit configured to determine whether the subject is normal by comparing a detection signal of the ultrasonic wave with a reference signal. Here, the light source generates the source light having a wavelength of 900 nm to 3000 nm in a near-infrared band.

According to an example, the source light may include a first source light; and a second source light having a wavelength that is different from the wavelength of the second source light.

According to an example, the first source light may have a first wavelength of a range of 1400 nm to 1500 nm.

According to an example, the first wavelength of the first source light may further have a range of 1800 nm to 2500 nm.

According to an example, the second source light may have a second wavelength of a range of 1500 nm to 1800 nm.

According to an example, the second wavelength of the second source light may further have a range of 1400 nm or less.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
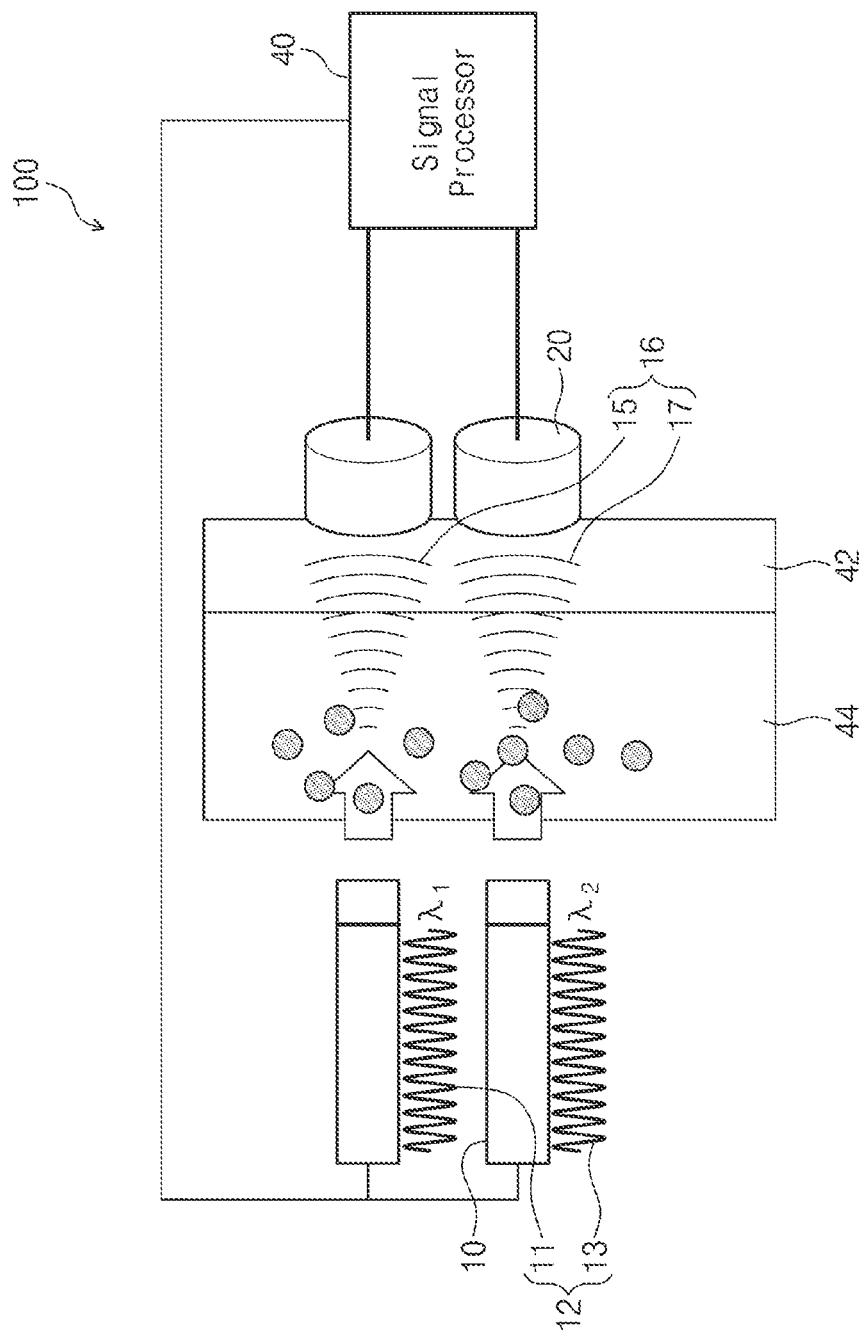
FIG. 1 is a block diagram of a photo-acoustic sensor device according to the inventive concept.

Embodiments of the inventive concept will now be described in detail with reference to the accompanying drawings. The advantages and features of embodiments of the inventive concept, and methods for achieving the advantages and features will be apparent from the embodiments described in detail below with reference to the accompanying drawings. However, the inventive concept may be embodied in different forms and should not be construed as limited to the embodiments set forth herein. Rather, these embodiments are provided so that this disclosure will be thorough and complete, and will fully convey the scope of the inventive concept to those skilled in the art, and the inventive concept is only defined by the scope of the claims. Like reference numerals refer to like elements throughout.

The terminology used herein is not for delimiting the embodiments of the inventive concept but for describing the embodiments of the inventive concept. The terms of a singular form may include plural forms unless otherwise specified. It will be further understood that the terms "includes", "including", "comprises", and/or "comprising", when used in this description, specify the presence of stated elements, steps, operations, and/or components, but do not preclude the presence or addition of one or more other elements, steps, operations, and/or components. Reference numerals, which are presented in the order of description, are provided according to the embodiments and are thus not necessarily limited to the order.

FIG. 1 illustrates an example of a photo-acoustic sensor device 100 according to the inventive concept.

Referring to FIG. 1, the photo-acoustic sensor device 100 of an embodiment of the inventive concept may be a photo-acoustic-based sensor device. According to an example, the photo-acoustic sensor device 100 may include light sources 10, detectors 20, and a control unit 40. The light sources 10 may generate an ultrasonic wave 16 by providing a source light 12 to a subject 44. The light sources 10 each may include a laser, a laser diode, or a light-emitting diode. The source light 12 may include a first source light 11 and a second source light 13 according to a wavelength thereof. Similarly, the ultrasonic wave 16 may include a first ultrasonic wave 15 and a second ultrasonic wave 17 according to a wavelength thereof. The subject 44 may include human skin tissue. A support body 42 may be in contact with the subject 44 and transfer the ultrasonic wave 16 to the detectors 20. The support body 42 may include a solid polymer. The detectors 20 may receive the ultrasonic wave 16 to generate a detection signal. The detectors 20 each may include a piezoelectric sensor, but an embodiment of the inventive concept is not limited thereto. The control unit 40 may calculate a value of glucose concentration in the subject 44 by comparing the detection signal with a reference signal, but an embodiment of the inventive concept is not limited to measuring the concentration of glucose. Furthermore, the control unit 40 may determine whether the subject 44 has a disease, but an embodiment of the inventive concept is not limited thereto. The control unit 40 may detect a temperature of the support body 42 and the subject 44.

Figure 2:
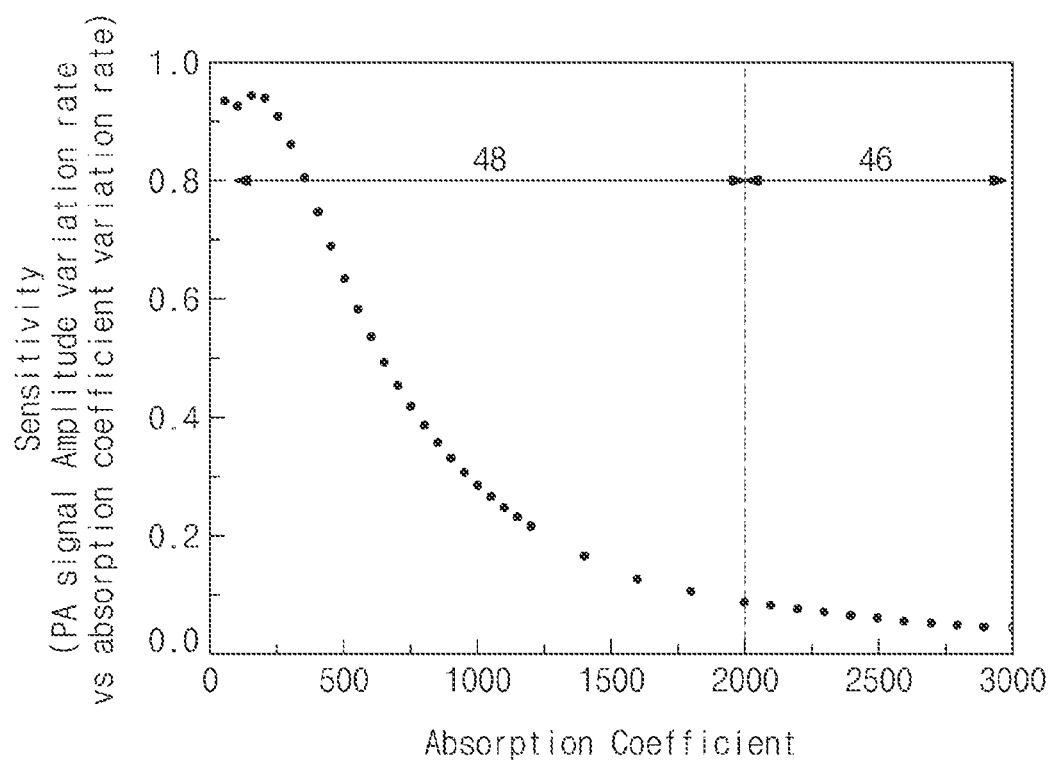
FIG. 2 is a graph illustrating sensitivity according to an absorption coefficient of the subject of FIG. 1.

FIG. 2 shows sensitivity according to an absorption coefficient of the subject 44.

Referring to FIG. 2, the subject 44 may generate the ultrasonic wave 16 with an absorption coefficient that changes according to the wavelength of the source light 12. A magnitude and characteristic of the generated ultrasonic wave 16 are determined by the absorption coefficient or the wavelength of the source light 12. For example, the wavelength of the source light 12 having an absorption coefficient of greater than 2000/m has sensitivity of a desensitization range 46 in which an ultrasonic characteristic change is small, and may be used as the first source light 11 for generating the reference signal. The wavelength of the source light 12 having an absorption coefficient of less than 2000/m has sensitivity of a sensitization range 48 in which an ultrasonic characteristic change is significant, and may be used as the second source light 13 for generating the detection signal.

Figure 3:
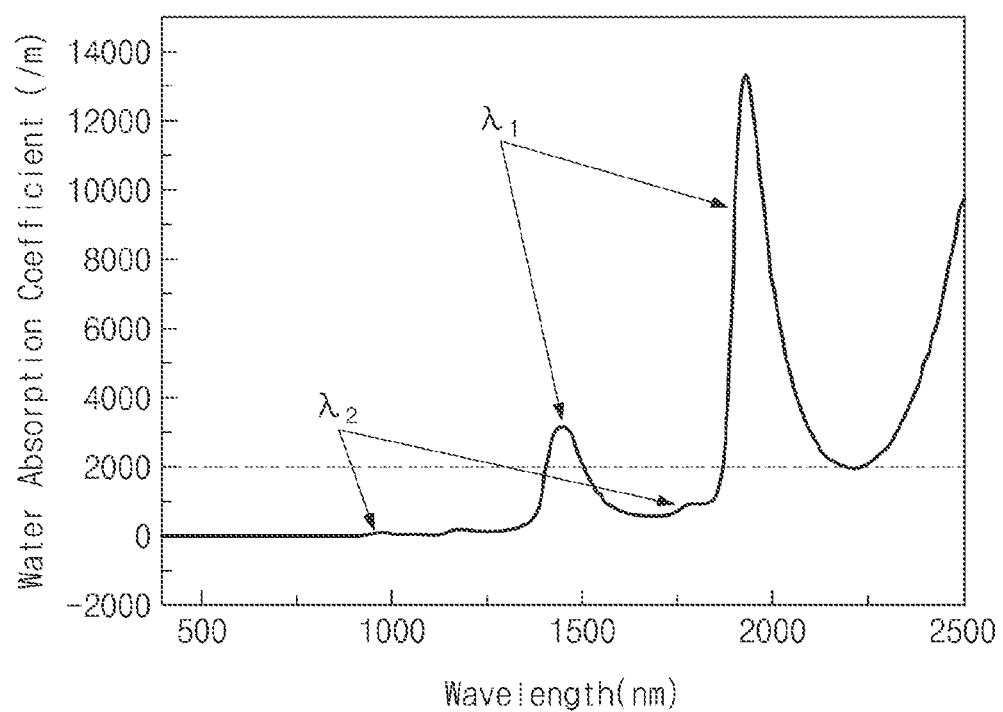
FIG. 3 is a graph illustrating an absorption coefficient of water according to the wavelength of the source light of FIG. 1.

FIG. 3 shows an absorption coefficient of water according to the wavelength of the source light 12 of FIG. 1.

Referring to FIGS. 1 to 3, the source light 12, which generates the reference signal and the detection signal, may include near-infrared light having a wavelength of about 900 nm to about 3000 nm.

According to an embodiment, the first source light 11 having an absorption coefficient of the desensitization range 46 may have a first wavelength $\lambda_1$. For example, the first wavelength Ai may be about 1400 nm to about 1500 nm. The first wavelength $\lambda_1$ may have a peak of about 1450 nm. Alternatively, the first wavelength $\lambda_1$ may be about 1800 nm to about 2500 nm. The first wavelength $\lambda_1$ may have a peak of about 1950 nm.

According to an embodiment, the second source light 13 having an absorption coefficient of the sensitization range 48 may have a second wavelength $\lambda_2$. For example, the second wavelength $\lambda_2$ may be about 1500 nm to about 1800 nm. Alternatively, the second wavelength $\lambda_2$ may be about 1400 nm or less.

The first source light 11 and the second source light 13 may respectively generate the first ultrasonic wave 15 and the second ultrasonic wave 17 in the subject 44. A magnitude and characteristic of the generated first ultrasonic wave 15 and second ultrasonic wave 17 may be affected not only by the absorption coefficient of the subject 44 but also by a size of the subject 44, a characteristic of the support body 42, and a characteristic of the detector 20. Since the magnitude and characteristic of the first ultrasonic wave 15 are unsusceptible to a change in the absorption coefficient of the subject 44, a measurement signal of the first ultrasonic wave 15 may be used as a reference signal for correcting a signal change due to a change in the size of the subject 44, the characteristic of the support body 42, and the characteristic of the detector 20. That is, the reference signal of the first ultrasonic wave 15 may be obtained as noise or a noise value.

On the contrary, since the magnitude and characteristic of the second ultrasonic wave 17 generated by the second source light 13 having a wavelength corresponding to the sensitization range 48 are susceptible to a change in the absorption coefficient, a measurement signal of the second ultrasonic wave 17 may be used as a detection signal for measuring an absorption coefficient value of the subject 44. The detection signal of the second ultrasonic wave 17 may be obtained as a measurement value.

A change in the characteristic of the second ultrasonic wave 17 due to the subject 44, the support body 42, and the detector 20 may be similar to the change in the characteristic of the first ultrasonic wave 15. The control unit 40 may precisely extract the absorption coefficient of the subject 44 without being influenced by external noise by using the first ultrasonic wave 15 as the reference signal and the second ultrasonic wave 17 as the detection signal. The control unit 40 may obtain an absorption coefficient value using a signal magnitude change, phase difference change, or the like of the reference signal and the detection signal. That is, the control unit 40 may obtain the absorption coefficient value by removing a noise value of the reference signal from the measurement value of the detection signal. Furthermore, the control unit 40 may obtain a blood glucose value by comparing the absorption coefficient value with the reference value. The control unit 40 may include a program for calculating a changed absorption coefficient as a blood glucose value, but an embodiment of the inventive concept is not limited thereto.

Figure 4:
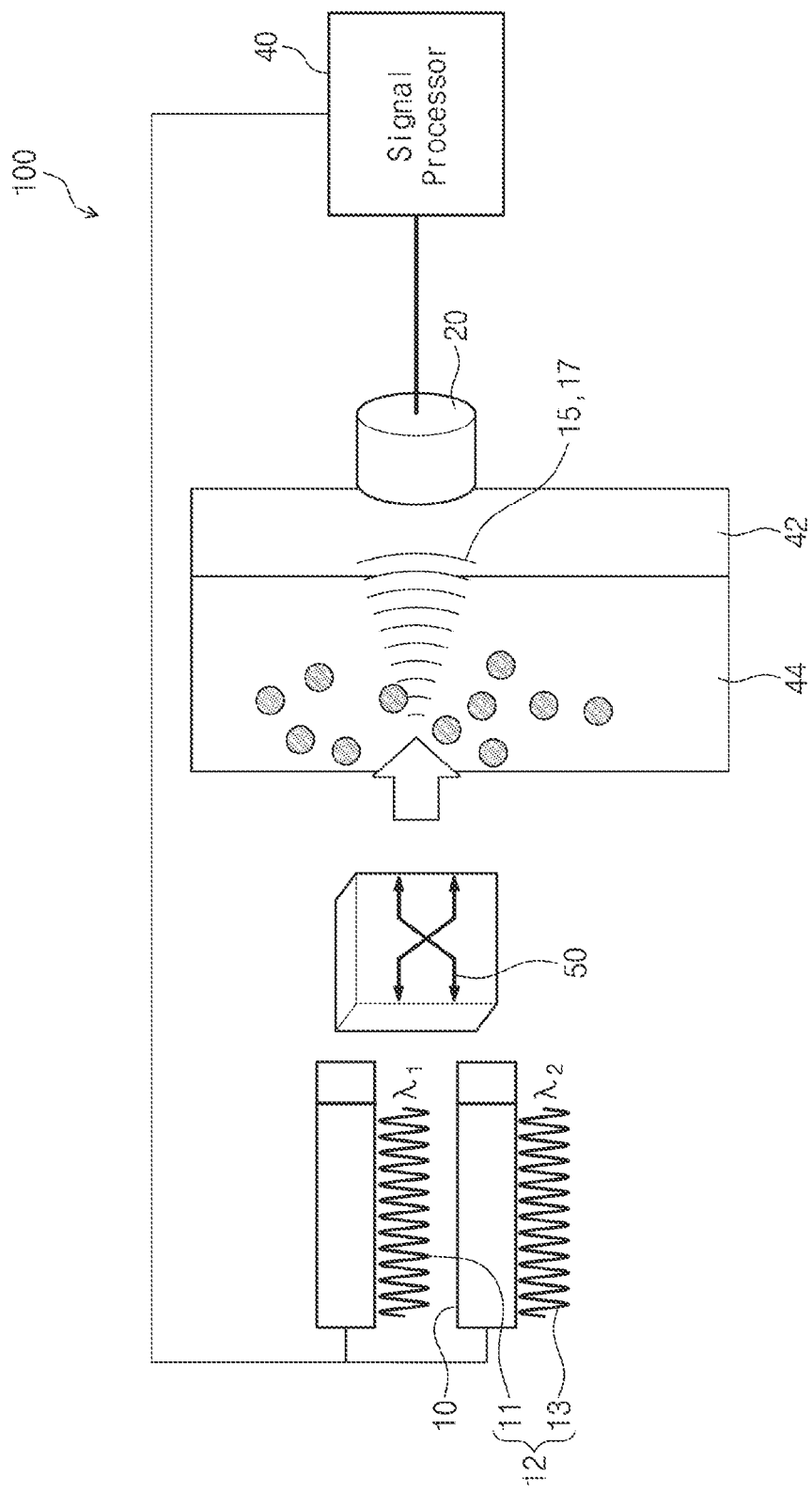
FIG. 4 is a cross-sectional view of a photo-acoustic sensor device according to the inventive concept.

FIG. 4 illustrates an example of a photo-acoustic sensor device 100 according to the inventive concept.

Referring to FIG. 4, the photo-acoustic sensor device 100 may further include an optical switch 50 and an optical coupler. The optical switch 50 may be provided between the light sources 10 and the subject 44. The optical switch 50 may switch the first source light 11 and the second source light 13. The detector 20 may be provided on one side of the subject 44 and the support body 42 opposing the optical switch 50. The light sources 10, the subject 44, the support body 42, and the control unit 40 may be configured in the same manner as illustrated in FIG. 1.

Figure 5:
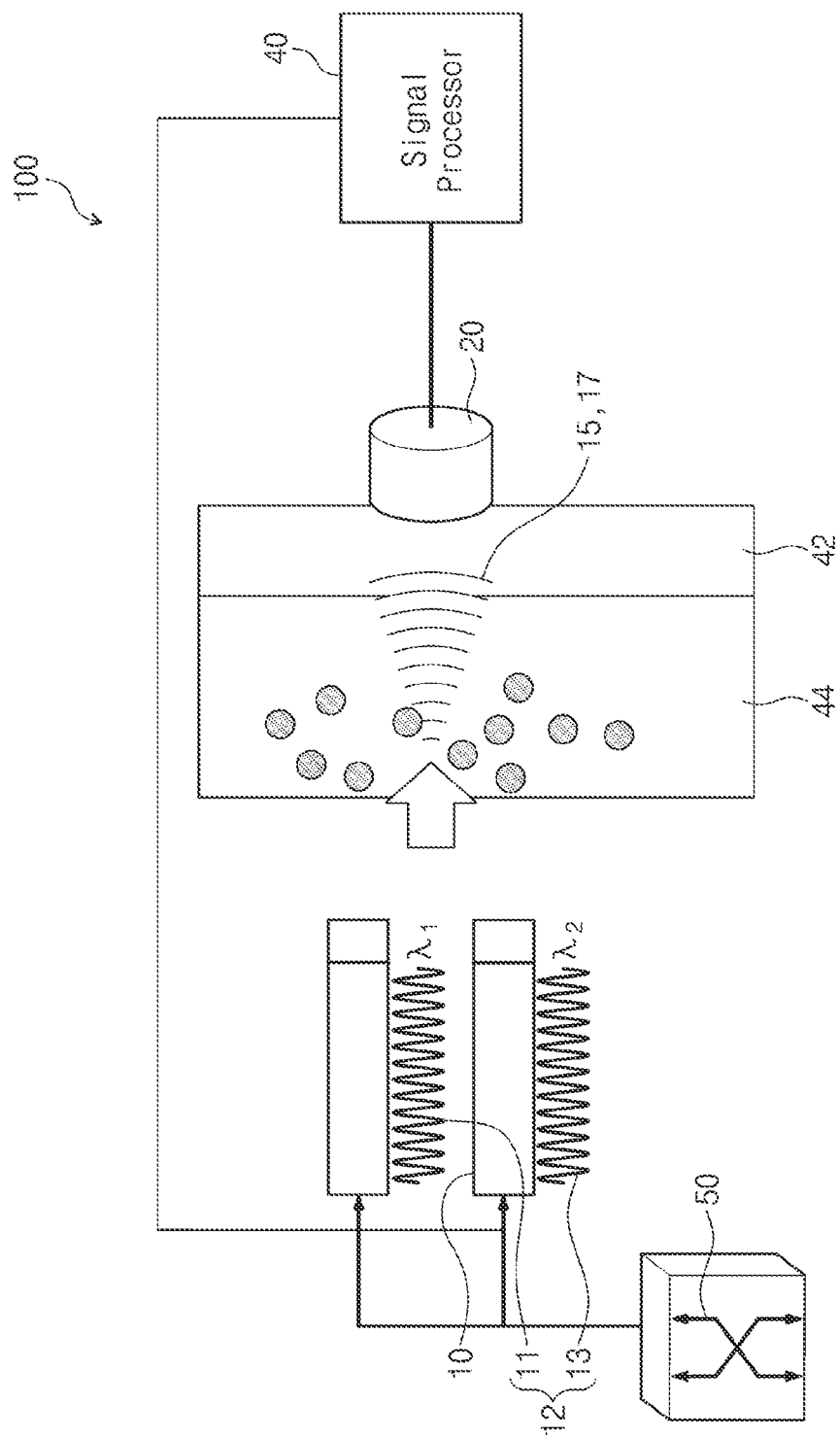
FIG. 5 is a cross-sectional view of a photo-acoustic sensor device according to the inventive concept.

FIG. 5 illustrates an example of a photo-acoustic sensor device 100 according to the inventive concept.

Referring to FIG. 5, the optical switch 50 of the photo-acoustic sensor device 100 may be provided at a front end of the light sources 10. The optical switch 50 may switch the first source light 11 and the second source light 13 provided to the light sources 10. In the case where the light sources 10 include an optical fiber laser, the optical switch 50 may switch pump lights. The light sources 10, the subject 44, the support body 42, the detector 20, and the control unit 40 may be configured in the same manner as illustrated in FIGS. 1 and 4.

A photo-acoustic sensing method of the photo-acoustic sensor device 100 of the inventive concept configured as above is described below.

Figure 6:
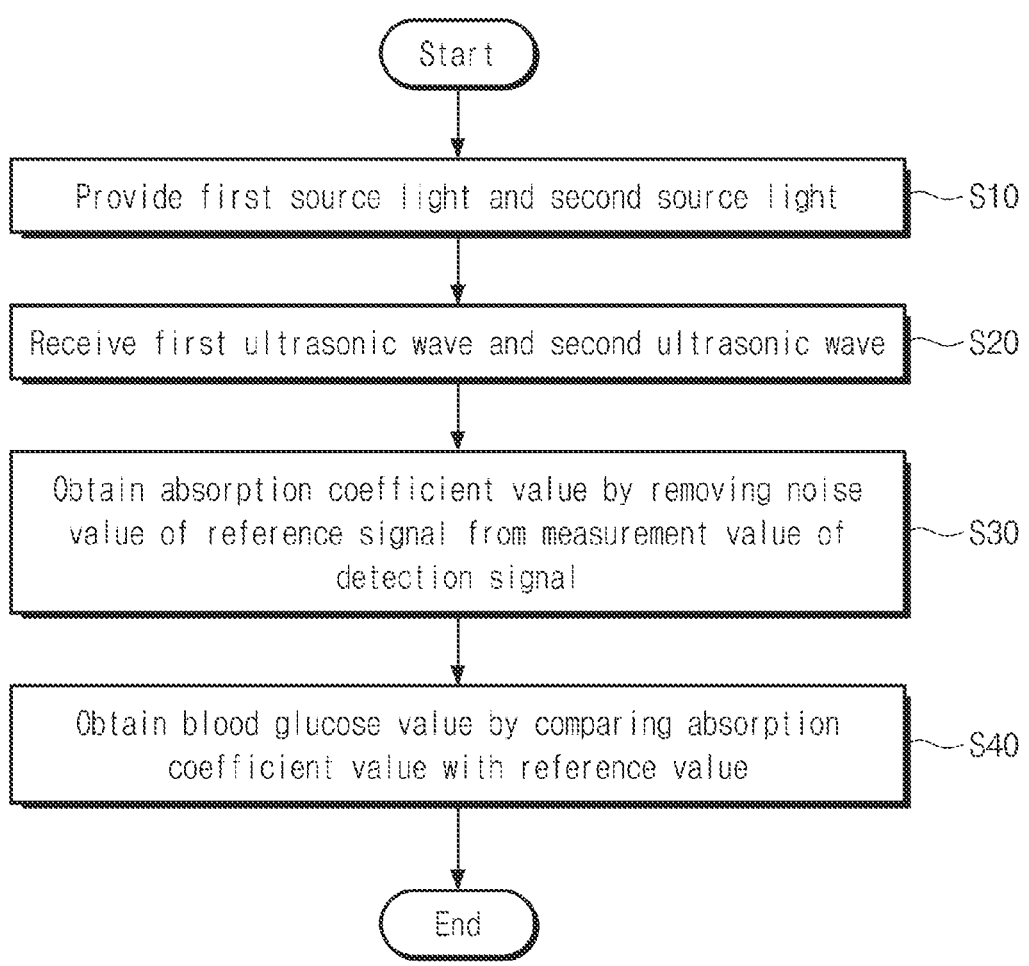
FIG. 6 is a flowchart illustrating a photo-acoustic sensing method of a photo-acoustic sensor device according to the inventive concept.

FIG. 6 illustrates a photo-acoustic sensing method of a photo-acoustic sensor device 100 according to the inventive concept.

Referring to FIGS. 1 and 6, the light sources 10 provide the first source light 11 and the second source light 13 to the subject 44 (S10). The first source light 11 and the second source light 13 may be absorbed in the subject 44 so as to respectively generate the first ultrasonic wave 15 and the second ultrasonic wave 17. The first source light 11 may have an absorption coefficient or wavelength corresponding to the desensitization range 46, and the second source light 13 may have an absorption coefficient or wavelength corresponding to the sensitization range 48. The first source light 11 and the second source light 13 may include near-infrared light having a wavelength of about 900 nm to about 3000 nm. The first source light 11 may have a first wavelength $\lambda_1$ of about 1400 nm to about 1500 nm or about 1800 nm to about 2500 nm. The second source light 13 may have a second wavelength $\lambda_2$ of about 1500 nm to about 1800 nm or about 1400 nm or less. The first ultrasonic wave 15 and the second ultrasonic wave 17 may be transferred to the detector 20 through the support body 42.

Next, the detector 20 receives the first ultrasonic wave 15 and the second ultrasonic wave 17 (S20). The detector 20 may generate a reference signal and a detection signal by receiving the first ultrasonic wave 15 and the second ultrasonic wave 17. The reference signal and the detection signal may be obtained as a measurement value and a noise value.

Next, the control unit 40 obtains an absorption coefficient value by removing the noise value extracted by the first ultrasonic wave 15 from the measurement value extracted by the second ultrasonic wave 17 (S30).

Furthermore, the control unit 40 obtains a blood glucose value by comparing the absorption coefficient value with a reference value (S40). The absorption coefficient value may be quantitatively determined according to the reference value.

Although not illustrated, the control unit 40 may use the absorption coefficient value and the reference value to determine whether the subject 44 has diabetes, but an embodiment of the inventive concept is not limited thereto.

As described above, a photo-acoustic sensor device and a photo-acoustic sensing method of the same according to an embodiment of the inventive concept may remove or minimize photo-acoustic noise using an ultrasonic wave generated by a source light having a first wavelength of about 1400 nm to about 1500 nm or about 1800 nm to about 2500 nm in a near-infrared band, which is unsusceptible to an external environment.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. A photo-acoustic sensing method, comprising:
    providing a source light in a subject;
    detecting an ultrasonic wave generated in the subject by the source light; and
    obtaining an absorption coefficient value of the subject,
    wherein the source light has a wavelength of 900 nm to 3000 nm in a near-infrared band,
    wherein the source light comprises:
        a first source light having a first wavelength band of 1800 nm to 2500 nm and generating a reference signal that includes a first noise value of the ultrasonic wave; and
        a second source light having a second wavelength band of 1500 nm to 1800 nm narrower than the first wavelength band and generating a measurement signal that includes a second noise value corresponding to the first noise value and the absorption coefficient value of the subject,
    wherein the absorption coefficient value is obtained by removing the second noise value subtracted from the first noise value.

2. The photo-acoustic sensing method of claim 1, wherein the ultrasonic wave includes:
    a first ultrasonic wave generated by the first source light; and
    a second ultrasonic wave generated by the second source light.

3. The photo-acoustic sensing method of claim 1, further comprising obtaining a blood glucose value by comparing the absorption coefficient value with a reference value.

4. A photo-acoustic sensor device, comprising:
    a light source configured to provide a source light to a subject;
    a detector configured to receive an ultrasonic wave generated in the subject by the source light; and
    a control unit configured to determine whether the subject is normal by comparing a detection signal of the ultrasonic wave with a reference signal,
    wherein the light source generates the source light having a wavelength of 900 nm to 3000 nm in a near-infrared band,
    wherein the source light comprises:
        a first source light having a first wavelength band of 1800 nm to 2500 nm and generating a reference signal that includes a first noise value of the ultrasonic wave; and
        a second source light having a second wavelength band of 1500 nm to 1800 nm narrower than the first wavelength band and generating a measurement signal that includes a second noise value corresponding to the first noise value and the absorption coefficient value of the subject,
    wherein the control unit obtains the absorption coefficient value by removing the second noise value subtracted from the first noise value and obtains a blood glucose value by comparing the absorption coefficient value with a reference.

\* \* \* \* \*